United States Patent
Zhou et al.

(10) Patent No.: US 7,627,301 B2
(45) Date of Patent: Dec. 1, 2009

(54) SPATIAL DIVERSITY RECEIVING DEVICE AND INPUT CHANNEL SWITCHING METHOD

(75) Inventors: Saixin Zhou, Shenzhen (CN); Liusi Ye, Shenzhen (CN); Hong Chen, Shenzhen (CN); Yunhui She, Shenzhen (CN); Fang Liu, Shenzhen (CN); Yueping Zuo, Shenzhen (CN)

(73) Assignee: Shenzhen Mindray Bio-Medical Electronics Co., Ltd., Shenzhen (CN)

( * ) Notice: Subject to any disclaimer, the term of this patent is extended or adjusted under 35 U.S.C. 154(b) by 475 days.

(21) Appl. No.: 11/636,084

(22) Filed: Dec. 8, 2006

(65) Prior Publication Data

US 2007/0197167 A1 Aug. 23, 2007

(30) Foreign Application Priority Data

Feb. 17, 2006 (CN) .......................... 2006 1 0033748

(51) Int. Cl.
*H04B 1/06* (2006.01)
*H04Q 7/20* (2006.01)
(52) U.S. Cl. .................................. 455/277.2; 375/347
(58) Field of Classification Search ......... 455/132–135, 455/140, 272, 277.1–277.2; 375/347
See application file for complete search history.

(56) References Cited

U.S. PATENT DOCUMENTS 5,557,603 A * 9/1996 Barlett et al. ............... 370/228
6,327,481 B1 * 12/2001 Nagashima ............. 455/562.1
6,640,104 B1 * 10/2003 Borst et al. ................. 455/450

FOREIGN PATENT DOCUMENTS

| CN | 1176544 A | 3/1998 |
|----|-----------|--------|
| CN | 1228644 A | 9/1999 |
| CN | 1248827 A | 3/2000 |
| CN | 1430423 A | 7/2003 |
| WO | 95/35600  | 12/1995 |

* cited by examiner

*Primary Examiner*—Lee Nguyen
(74) *Attorney, Agent, or Firm*—Kory D. Christensen; Stoel Rives LLP

(57) ABSTRACT

The invention relates to a spatial diversity receiving device and an input channel switching method. The device comprises a main control circuit and at least one receiving channel including a RF selective switch, wherein the circuit controls the switch, so as to select one of the plurality of input signals from the plurality of antennae and send that signal to a receiving module. The module comprises a RSSI unit for outputting a RSSI value and sends the value to the circuit. On basis of a real time analysis to the receiving signal, the circuit selects a predetermined occasion to perform a compulsive switching and dynamically selects the antenna with a stronger signal so that the generation of error code due to transient interference may be reduced. The system exhibits an excellent resistance to wireless signal fading, and has a simple structure as well as a low cost and power consumption.

11 Claims, 3 Drawing Sheets

SPATIAL DIVERSITY RECEIVING DEVICE AND INPUT CHANNEL SWITCHING METHOD

RELATED APPLICATION

The present application claims the priority of the Chinese Patent Application No. 200610033748.7, filed Feb. 17, 2006, titled "Spatial Diversity Receiving Device and Input Channel Switching Method", which is incorporated herein by reference.

FIELD OF THE INVENTION

The present invention relates to a diversity system with a plurality of spatially separate independent antennae, in particular to a receiving device and input channel switching method for use in medical telemetry monitoring or testing system.

BACKGROUND OF THE INVENTION

Telemetry monitoring is one important trend for the development of products in the field of medical equipment. Since the electromagnetic wave signal strength fading occurs upon encountering obstacles or generation of inter-wave interference, there exists correspondingly a receiving blind zone for the wireless signal carrying telemetry information. Therefore, one of the key techniques for the enhancement of product competitiveness is to improve the receiver's capability of channel fading resistance so as to eliminate the influence of wireless signal fading on data transfer.

Thus the antenna diversity technique comes into existence. With respect of the form, the diversity technique includes time diversity, frequency diversity, code diversity and spatial diversity. The spatial diversity receiving technique is the technique of providing a plurality of spatial signal receiving channels by using a plurality of appropriately arranged antennae, and always selecting the channel with a stronger signal to perform data transfer, so as to substantially eliminate the influence of the signal fading.

The prior art solutions based on the spatial diversity techniques are mainly classified into two types. In the case of a two-antenna configuration, the first type is to dynamically monitor the receiving signal strength of the current antenna input channel, and switch to the other antenna compulsively where the strength is lower than a preset threshold value. This solution requires to provide only one received signal strength indication (referred to as RSSI hereinafter) unit for two antenna input channels. The second type is to simultaneously dynamically monitor the receiving signal strength of each of the two antenna input channels, and automatically select the antenna with a stronger signal strength as the input channel. This solution requires to provide two RSSI units independent of each other for the two antenna input channels, respectively.

The prior art technique as mentioned above has the following disadvantages. The channel switching according to the first solution is rather passive, as it is activated only when the signal strength is very weak, while communication error code may have already been generated at this point of time. Furthermore, the switching likely occurs in the transfer process of a data frame, and therefore the transient interference caused by the switching may give rise to additional error codes. In addition, since the signal status of the other channels remains unknown before switching, it is likely that the post-switching signal strength is even weaker, which leads to more serious error codes.

The second solution overcomes the disadvantage of the first solution in that it always selects the antenna with stronger signal strength as the signal input channel. However, the total number of the RSSI units is twice that of the first solution, and every two RSSI units have to be connected to a different antenna input and the receive frequency should always be synchronous As such, these two RSSI units ask for self-contained input, mixed-frequency and mid-frequency circuits, which complicates the realization of this solution and incurs a fairly high cost. In addition, the second solution switches the channels compulsively according to the result of signal strength comparison as the first solution, and thereby cannot address the problem of error code due to transient switching interference.

SUMMARY OF THE INVENTION

It is an object of the present invention to provide an improved spatial diversity receiving device and an input channel switching method, which removes the deficiency in the prior art. Applicable in telemetry monitoring or testing equipment, the solution of the present invention may achieve a real time selection of the antenna input channel with a stronger signal strength, and avoid the generation of interference error code at the moment of switching, while reducing the cost of implementation at the same time.

Before a detailed description to the technical solutions for realizing the above object, it is necessary to take a look at the test as shown in FIG. 1. It illustrates a record of strength variation of two antenna signals as received by two receiver antennae which are placed in different spatial positions, and which move with the emitter at a normal walking speed. In this test the signal strength is measured by RSSI. As observed from this test, the signal fading at a certain spatial point caused by factors such as multipath effect and waveform superposition has the following characteristics: on the one hand, fading hardly occurs simultaneously at different spatial locations, particularly where two locations are over ¼ wavelength apart; on the other hand, within the 175-614 MHz wave band, when the emitter is moving at a normal walking speed, the fading period of a complete receive signal is typically around 200 mS.

Accordingly, the basic concept of the present invention is to erect two or more antennae in spatially different locations and assign one RSSI unit for each of the receiving channels. On the basis of a real time analysis of the receiving signal, a predetermined occasion is selected, for instance, the inter-frame space between every two data frames being transferred or after the completion of a data frame transfer, to perform the compulsive switching and dynamically select the antenna with a stronger signal. When a judgement on channel switching is performed within a period short than 100 mS (half of a full fading period), the error codes resultant from transient interference may be significantly reduced. Additionally, it is feasible to shorten the waiting period for reading the RSSI value by analyzing RSSI value variation, such that the time necessary for determining the channel switching is minimized so as to further enhance the real time property.

The technique solutions embodying the concept of the present invention are as follows.

According to the first aspect of the present invention, an antenna input channel switching method for spatial diversity reception is provided, which is based on a receiving device for use in a telemetry monitoring or testing system including at least two antennae. The method comprises the steps: A. a main control circuit of the receiving device randomly selects an input signal coming from one of the at least two antennae and sends that signal to the receiving channel; B. the main control circuit waits and selects a predetermined occasion to perform the following steps (i.e. step C, D and E); C. the main control circuit records the RSSI value of the current signal output by the received signal strength indication unit provided within the channel as an original RSSI value; D. the main control circuit selects an input signal from another antenna, and sends that signal to the receiving channel; and E. the main control circuit reads the current RSSI value output by the received signal strength indication unit, and then determines whether the signal to be input into the channel is to come right along from the currently selected antenna, or is to be switched back to the previously selected antenna. The above steps B-E are performed repeatedly.

In step E, the main control circuit does not read the current RSSI value until it waits a preset time period, which value indicates the RSSI trend of the current input signal. The determination process of the main control circuit in step E comprises the following steps of: comparing the original RSSI value with the current RSSI value, and if the former is greater than the latter, controlling in a manner to switch the input signal back to come from the previously selected antenna, or otherwise maintaining the input signal coming from the currently selected antenna.

The predetermined occasion as mentioned may be the time at which the transfer of one data frame completes, wherein a time period necessary for completing transfer of one data frame is preferably 100 ms or less. As an alternative, the predetermined occasion may be an interframe space. Still another alternative, the predetermined occasion may be the initial stage of response.

The determination of the predetermined occasion comprises the following steps: a. the main control circuit receives and analyzes the data transferred from the receiving channel, searching for bit synchronization and frame synchronization signals; b. if the synchronization signal is detected, the main control circuit continues to make a judgement on a data frame structure, and determines the interframe space or initial stage of response, if detected, as the predetermined occasion, or otherwise the time, at which the transfer of one data frame completes, as the predetermined occasion.

In case there are two or more receiving channels, the configurations of the receiving channels are such that they respectively operate at different receiving frequencies, and that the input signals thereof are controlled and selected by the main control circuit.

According to the second aspect of the present invention, there is provided a spatial diversity receiving device, for use in a telemetry monitoring or testing system including a plurality of antennae. The receiving device comprises a main control circuit and at least one receiving channel including a RF selective switch, wherein the main control circuit controls the RF selective switch, so as to select one of the plurality of input signals coming from the plurality of antennae and send that signal to a receiving module of the receiving channel. The receiving module comprises a received signal strength indication unit for outputting a RSSI value corresponding to an input signal and sending the value to the main control circuit. The main control circuit further receives the data transferred to the receiving module.

The RSSI value is sent to the main control circuit via an A/D convertor. In case there are two or more receiving channels, the output of each of the antennae, having passed by an amplifying circuit and a branch circuit, is correspondingly divided into a plurality of branches, which are then output to each of the RF selective switches.

With the advantage of the spatial diversity receiving device and the input channel switching method of the present invention, it is possible to dynamically monitor and switch antennae in real time, and excellently resist the channel fading due to movement of the emitter and the like, as well as completely eliminate the transient interference generated by antenna switching. At the same time, since each receiving channel is provided with only one RSSI unit, the system has a simple structure, and affords a low cost and power consumption.

DETAILED DESCRIPTION OF THE INVENTION

The present invention will be further elucidated in the following in combination with the preferred embodiment shown in the accompany drawings.

Figure 1:
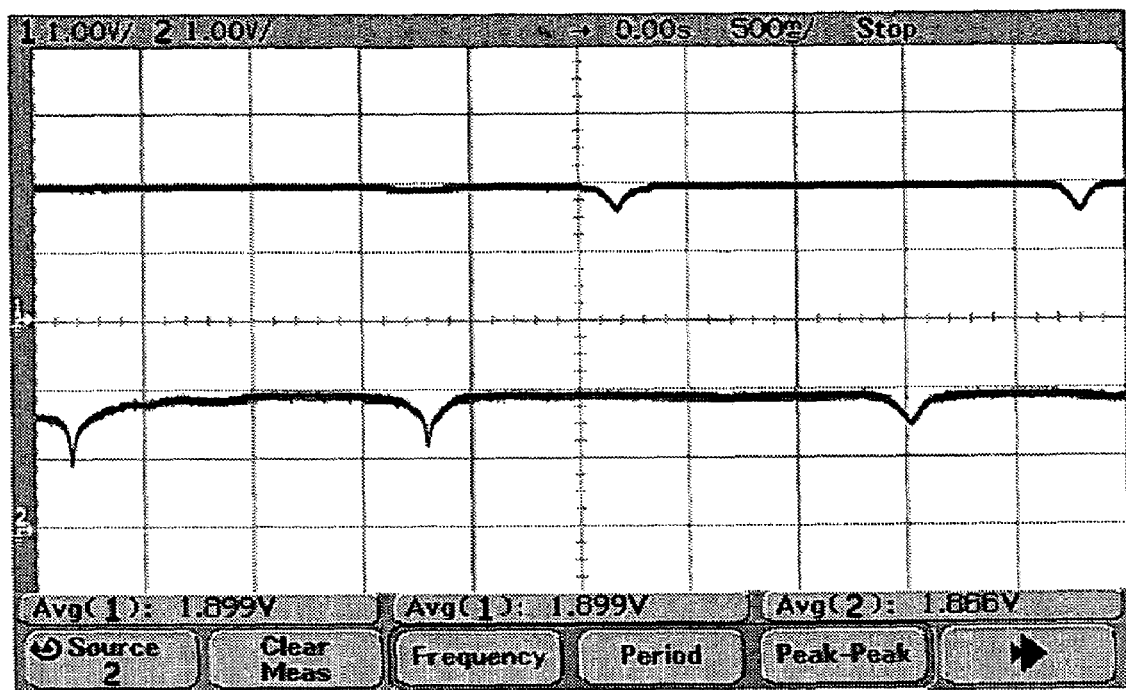
FIG. 1 is a drawing illustrating the signal fading or the wireless receiving signal in prior art.
Figure 2:
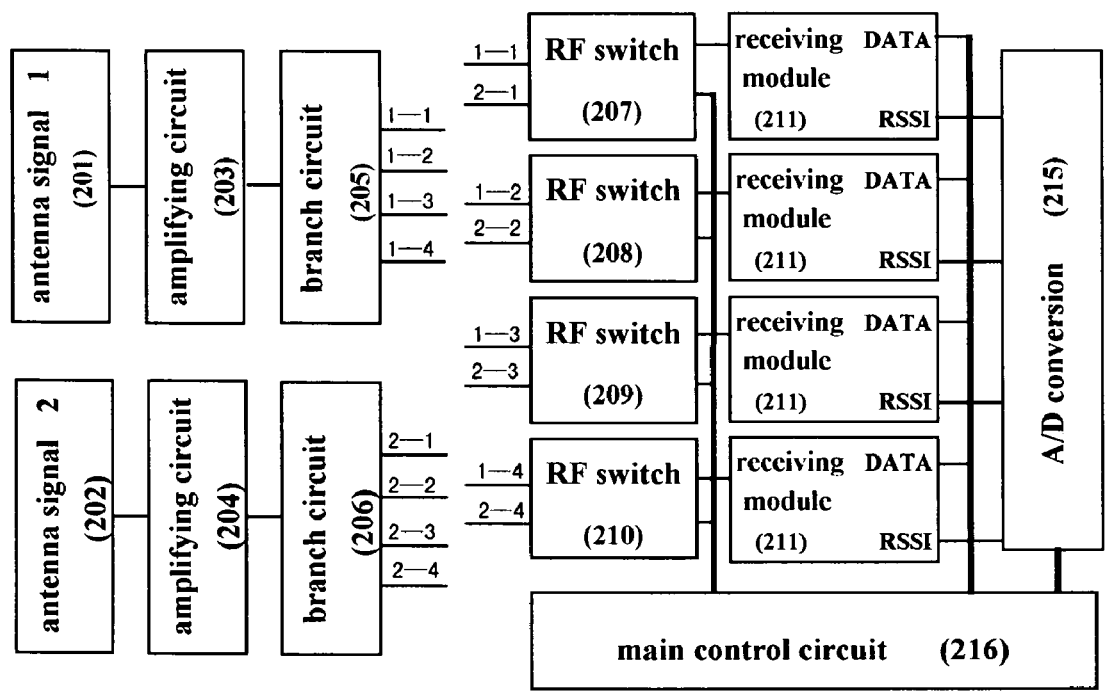
FIG. 2 is a block diagram illustrating the receiving system of the receiving device according to the present invention.

The receiving device of the present invention comprises a main control circuit and at least one receiving channel including a RF selective switch, which device is used in a telemetry testing system comprising a plurality of antennae. In case there are two or more receiving channels, the output of each of the antennae, having passed by the amplifying circuits 203, 204 and the branch circuits 205, 206, is correspondingly divided into a plurality of branches, which are then output to each of the RF selective switches 207-210, respectively. The configuration of the present application may be, but not limited to, those having two antennae and four receiving channels, as shown in FIG. 2. The main control circuit 216 controls the RF selective switch 207-210, so as to select one of two input signals from antenna 201 and antenna 202 and send it to the receiving modules 211-214 of the corresponding receiving channels. Each of the receiving modules 211-214 comprises a received signal strength indication unit (RSSI unit) for outputting the RSSI value corresponding to the input signal and sending the value to the main control circuit 216. The RSSI value may be sent to the main control circuit 216 via an A/D convertor 215. The main control circuit 216 further receives the data transferred from each of the receiving modules 211-214. The configuration of the receiving modules may be such that they operate at different receiving frequencies, in which case the antennae may be shared within, for example, the wave band of 175 MHz~614 MHz, and that the input signals thereof are controlled and selected by the main control circuit 216.

Figure 3:
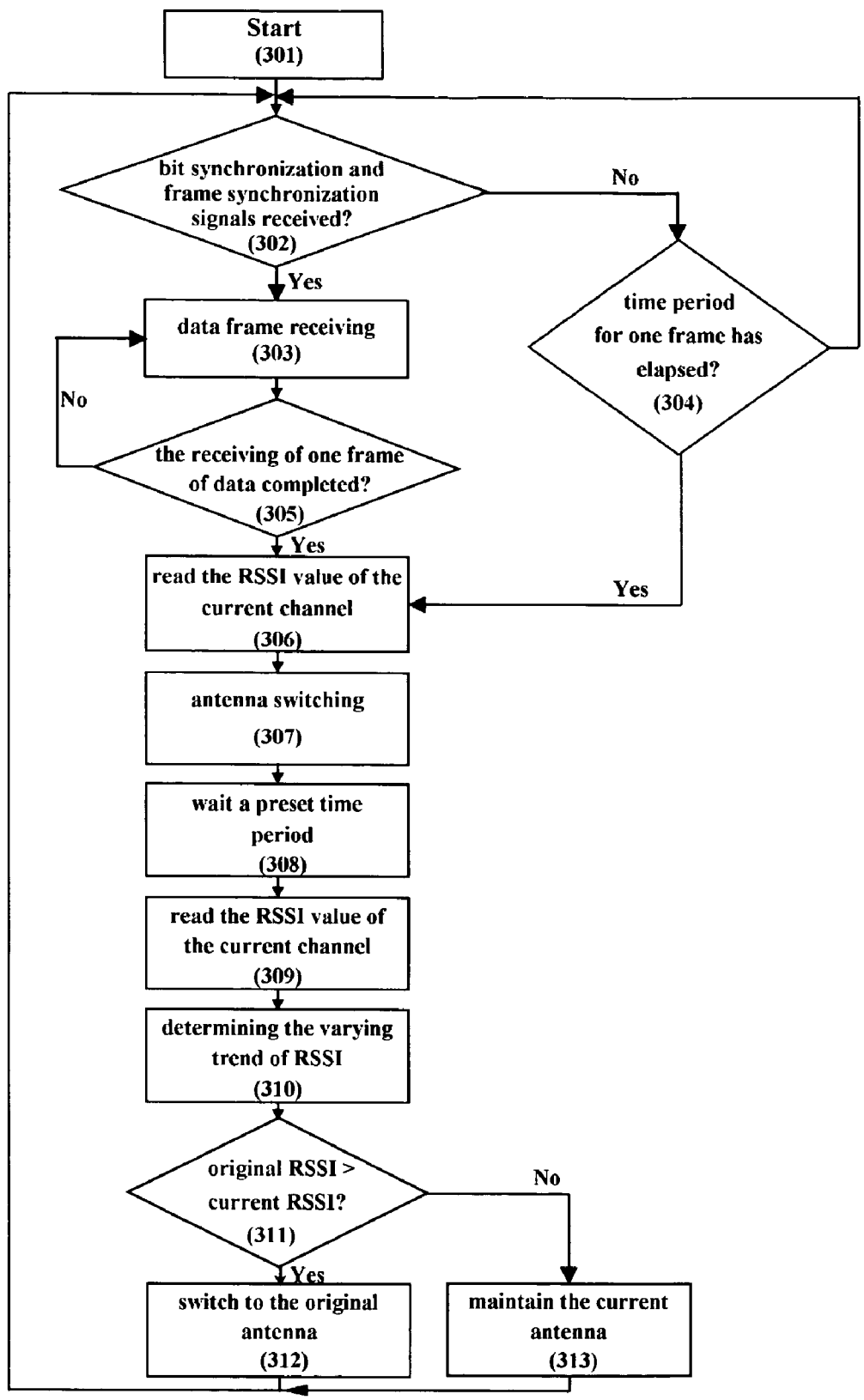
FIG. 3 is a flow chart of the method according to the present invention.

As shown in the flow chart of FIG. 3, to avoid the error code generated at the moment of switching channels, the present invention provides an input channel switching method on the basis of the receiving device as mentioned, which is implemented through the software embedded in the main control circuit 216. For each of the receiving channels, the method comprises the following steps:

A. after activation of the receiving channel (block 301), the main control circuit 216 randomly selects an input signal coming from one of the plurality of antennae 201-202, and subsequently sends that signal to the receiving channel; the following steps are then carried out repeatedly:

B. the main control circuit 216 waits and selects a predetermined occasion to perform the following steps C-E;

C. the main control circuit 216 records the RSSI value of the current signal output by the RSSI unit provided within the channel as the original RSSI value;

D. the main control circuit 216 controls in a manner to select the input signal from another antenna, and sends it to the receiving channel;

E. the main control circuit reads the current RSSI value output by the RSSI unit (block 306), and then determines whether the signal to be input into the channel is to come right along from the currently selected antenna (block 313), or is to be switched back to the previously selected antenna (block 312).

In the process of antenna switching (block 307), it takes a long period of time, for example, 5 ms, to stabilize the RSSI value. Consequently, to effectively shorten the time for determination of antenna switching, in step E of the input channel switching method of the present invention, the main control circuit 216 does not wait till the RSSI value becomes stabilized, but instead waits a preset time period (block 308) before it reads the value (block 309), so as to have knowledge of the RSSI trend of the current input signal (block 310). This preset and relatively short time period may be for example 1 ms, which is dependent on the hardware characteristics of the RSSI unit.

The determination process comprises the following steps of: the main control circuit 216 comparing the original RSSI value with the current RSSI value (block 311), and, if the former is greater than the latter, then controlling in a manner to switch the input signal back to the previously selected antenna (block 312), or otherwise maintaining the input signal coming from the currently selected antenna (block 313).

Step B is the key point of the present invention. To avoid the switching occurring in the data frame transfer process, the predetermined occasion may be the time at which one data frame transfer completes (block 305), such that the antennae are switched at a fixed time interval. With respect to the receiving signal within the wave band of 175 MHz~614 MHz, this time period is normally no longer than 100 ms. To avoid the longtime accumulation of errors in the system, this predetermined occasion is preferably determined according to the following steps shown in FIG. 3:

a. the main control circuit 216 receives and analyzes the data transferred from the receiving channel, searching for bit synchronization and frame synchronization signals (block 302);

b. if the synchronization signals are detected, the main control circuit 216 continues to make a judgement on the structure of the data frame (block 303), and determines the interframe space or initial stage of response, if detected, as the predetermined occasion, or otherwise the time, at which the transfer of one data frame completes, as the predetermined occasion (block 304). Thus, the periodic compulsive switching comparison may be activated in some extreme circumstances, for example, where the input signals from the two antennae are both very weak, which seldom occurs, until the synchronization switching comparison of the data frames is restored.

Since the signal strength of different antennae varies, the RSSI signals output by the receiving modules have different magnitudes. With the above method, even where the monitoring system has at least three antennae, steps D and E may be repeatedly performed for a number of times, until the input signal from each of the antennae has been detected by the received signal strength indication unit. Thus the main control circuit 216 always selects the antenna with stronger signal strength as the input antenna for the next frame of data. Furthermore, each receiving module with a different frequency is capable of selecting the antenna with stronger signal strength independently, through the branch circuit and the RF selective switch.

The antenna of the present invention is not limited to a single antenna, but may be an antennae array consisting of a plurality of antennae as well.

The present invention is proved experimentally to exhibit an excellent resistance to wireless signal fading.

The invention claimed is:

1. An antenna input channel switching method for spatial diversity reception, on the basis of a receiving device for use in a telemetry monitoring or testing system including at least two antennae, the method comprising steps:

A. a main control circuit of the receiving device randomly selects an input signal coming from one of the at least two antennae and sends that signal to a receiving channel;

B. the main control circuit waits and selects a predetermined occasion to perform the following steps, wherein the predetermined occasion is selected from a group comprising at least one of an interframe space between two data frames being transferred and a time at which a transfer of one data frame completes;

C. the main control circuit records the RSSI value of the current signal output by a received signal strength indication unit provided within the channel as an original RSSI value;

D. the main control circuit selects an input signal from another antenna as a currently selected antenna, and sends that signal to the receiving channel; and E. the main control circuit reads the current RSSI value output by the received signal strength indication unit, and then determines whether the signal to be input into the channel is to come right along from the currently selected antenna, or is to be switched back to the previously selected antenna, wherein the steps B-E are performed repeatedly.

2. The antenna input channel switching method according to claim 1, wherein the time at which the transfer of one data frame completes is selected based on a fading period determined by analyzing RSSI value variation.

3. The antenna input channel switching method according to claim 1, wherein a time period necessary for completing transfer of one data frame is 100 ms or less.

4. The antenna input channel switching method according to claim 1, wherein the group of predetermined occasions further comprises an initial stage of response.

5. The antenna input channel switching method according to claim 1, wherein the determination of the predetermined occasion comprises the following steps:

a. the main control circuit receives and analyzes the data transferred from the receiving channel, searching for bit synchronization and frame synchronization signals; and b. if the bit synchronization and frame synchronization signals are detected, the main control circuit continues to make a judgement on a data frame structure, and determines the interframe space or an initial stage of response, if detected, as the predetermined occasion, or otherwise the time at which the transfer of one data frame completes, as the predetermined occasion.

6. The antenna input channel switching method according to claim 1, wherein in step E, the main control circuit does not read the current RSSI value until it waits for a preset time period, the value indicative of the RSSI trend of the current input signal.

7. The antenna input channel switching method according to claim 1, wherein the determination process of the main control circuit in step E comprises the following steps of:
comparing the original RSSI value with the current RSSI value, and, if the former is greater than the latter, controlling in a manner to switch the input signal back to come from the previously selected antenna; otherwise, maintaining the input signal coming from the currently selected antenna.

8. The antenna input channel switching method according to claim 1, wherein:
where there are two or more receiving channels, the configurations of the receiving channels are such that they respectively operate at different receiving frequencies, and that the input signals thereof are controlled and selected by the main control circuit.

9. A spatial diversity receiving device for use in a telemetry monitoring or testing system including a plurality of antennae, the receiving device comprising:
a main control circuit and at least one receiving channel including a RF selective switch,
wherein the main control circuit controls the RF selective switch, so as to select one of the plurality of input signals coming from the plurality of antennae and send that signal to a receiving module of the receiving channel, which receiving module comprises a received signal strength indication unit for outputting a RSSI value corresponding to an input signal and sending that value to the main control circuit;
wherein the main control circuit further receives the data transferred to the receiving module;
wherein the main control circuit waits and selects a predetermined occasion to perform the following steps, wherein the predetermined occasion is selected from a group comprising at least one of an interframe space between two data frames being transferred and a time at which a transfer of one data frame completes;
wherein the main control circuit records the RSSI value of the current signal output by the received signal strength indication unit as an original RSSI value;
wherein the main control circuit selects an input signal from another antenna as a currently selected antenna, and sends that signal to the receiving channel; and
wherein the main control circuit reads the current RSSI value output by the received signal strength indication unit, and then determines whether the signal to be input into the receiving channel is to come right along from the currently selected antenna, or is to be switched back to the previously selected antenna.

10. The spatial diversity receiving device according to claim 9, wherein the RSSI value is sent to the main control circuit via an A/D convertor.

11. The spatial diversity receiving device according to claim 9, wherein:
if there are two or more receiving channels, output signals of each of the antennae, having passed by an amplifying circuit and a branch circuit, is correspondingly divided into a plurality of branches, which are then output to each of the RF selective switches respectively.

* * * * *